United States Patent [19]

Frankhuizen

[11] 4,174,039
[45] Nov. 13, 1979

[54] RECORDING DISK CARTRIDGE

[75] Inventor: Michiel Frankhuizen, Martinez, Calif.

[73] Assignee: Xerox Corporation, Stamford, Conn.

[21] Appl. No.: 754,653

[22] Filed: Dec. 27, 1976

[51] Int. Cl.² .......................... B65D 21/04; G11B 1/02
[52] U.S. Cl. ...................................... 206/444; 206/507; 220/4 B
[58] Field of Search ................ 206/303, 307, 309–310, 206/312, 444, 503, 507, 514, 45.2; 220/4 B, 4 C, 4 D, 4 E, 315; 346/137; 360/98–99, 133, 135; 312/9–12

[56] References Cited

U.S. PATENT DOCUMENTS

| | | | |
|---|---|---|---|
| 1,886,109 | 11/1932 | Lenfant | 220/4 D |
| 3,509,992 | 5/1970 | David et al. | 206/444 |
| 3,586,158 | 6/1971 | Muscatiello | 206/45.2 X |
| 3,635,608 | 1/1972 | Crouch et al. | 206/444 |
| 3,908,852 | 9/1975 | Ricobene et al. | 220/4 D X |

*Primary Examiner*—Stephen Marcus
*Attorney, Agent, or Firm*—Barry Paul Smith

[57] ABSTRACT

A recording disk cartridge comprises a housing in which at least one recording disk may be mounted for rotation about its axis. The housing has a peripheral side wall about which a ridge is formed, the ridge being defined by a plurality of sections at least some of which are spaced from one another in a direction parallel to the axis of rotation of a disk mounted in the housing. The dimensions and spacings of the ridge sections are such that the contour of the peripheral side wall at the lower surface of the ridge is the substantial complement of the contour of the peripheral side wall at the upper surface of the ridge. The cartridge also comprises a cover including a peripheral side wall having a contour at its upper surface substantially the same as that of the peripheral side wall of the housing at the lower and upper surfaces of the ridge. The cover may thus be disposed over the lower end of the housing with the upper surface of the peripheral side wall of said cover seated against the lower surface of the ridge, and may also be disposed upside-down over the upper end of the housing with the upper surface of the peripheral side wall of the cover seated against the upper surface of the ridge.

11 Claims, 4 Drawing Figures

RECORDING DISK CARTRIDGE

BACKGROUND OF THE INVENTION

This invention relates to recording disk cartridges and, more particularly, to recording disk cartridges of the general type comprising a housing in which at least one recording disk may be mounted for rotation about its axis, and and a cover normally disposed over the lower end of the housing and capable of being removed when the cartridge is loaded into a disk drive and placed upside-down on top of the cartridge housing for storage.

The general type of disk cartridge above-described is well-known and has been used for some time. The IBM 5440 disk cartridge, which has a single magnetic recording disk, is one example and a disclosure of such disk cartridge may be found in U.S. Pat. No. 3,635,608. An example of a disk drive in which such a cartridge may be used is disclosed in copending U.S. application Ser. No. 633,206 filed on Nov. 19, 1975 in the name of James L. Johnson for Improved Linear Actuator and assigned to the assignee of the present invention, now U.S. Pat. No. 4,012,778.

It would be desirable if a recording disk cartridge having more than one disk mounted therein could be utilized in the same disk drive that normally is adapted to accomodate a single disk cartridge, such as the disk drive disclosed in the above-referenced application Ser. No. 633,206.

A problem with utilizing the same type of cartridge disclosed in U.S. Pat. No. 3,635,608, but with the requisite number of disks mounted therein, e.g. three, is while there would probably be enough room in the disk drive to accomodate the cartridge housing assembly itself without the removable cover, there would be no room to store the cover on top of the housing. Specifically the rim defined in the top of the housing of the cartridge disclosed in U.S. Pat. No. 3,635,608 would result in a substantial increase in the combined height of the housing assembly and cover with the cover positioned on top of the housing in the rim. Such significant combined height would be greater than the storage capacity of most drives, such as the one disclosed in application Ser. No. 633,206. Accordingly, the cover would have to be left out of the drive during use of the cartridge.

Not being able to store the removable cover in the drive during use of the cartridge is not only an inconvenience to the operator, but the cover can become contaminated when not in place on the cartridge and may be misplaced during use of the cartridge.

It would be desirable, therefore, to provide a disk cartridge having a desired number of disks rotatably mounted therein, e.g. three, wherein the maximum height of the cartridge with the cover positioned on top of the housing for storage is substantially the same as or less than the maximum height of conventional one disk cartridges with the cover in storage position, such as the cartridge disclosed in U.S. Pat. No. 3,635,608.

SUMMARY OF THE INVENTION

In accordance with the invention, a recording disk cartridge is provided comprising a housing in which at least one recording disk may be mounted for rotation about its axis, said housing having a peripheral side wall about which a ridge is formed, said ridge being defined by a plurality of sections at least some of which are spaced from one another in a direction parallel to the axis of rotation of a disk mounted in said housing, the dimensions and spacings of said sections being such that the contour of said peripheral side wall at the lower surface of said ridge is the substantial complement of the contour of said peripheral side wall at the upper surface of said ridge; and a cover including a peripheral side wall having a contour at its upper surface substantially the same as the contour of the peripheral side wall of said housing at the lower and upper surfaces of said ridge, whereby said cover may be disposed over the lower end of said housing with the upper surface of the peripheral side wall of said cover seated against the lower surface of said ridge, and whereby said cover may also be disposed upside-down over the upper end of said housing with the upper surface of the peripheral side wall of said cover seated against the upper surface of said ridge.

In the preferred embodiment, three magnetic recording disks are rotatably mounted in the cartridge and the overall height of the cartridge with the removable cover positioned on top of the housing for storage is substantially the same as the overall height of conventional one disk cartridges with the removable cover in storage position.

These and other aspects and advantages of the present invention will be more completely described below with reference to the accompanying drawings.

DESCRIPTION OF THE PREFERRED EMBODIMENT

Figure 1:
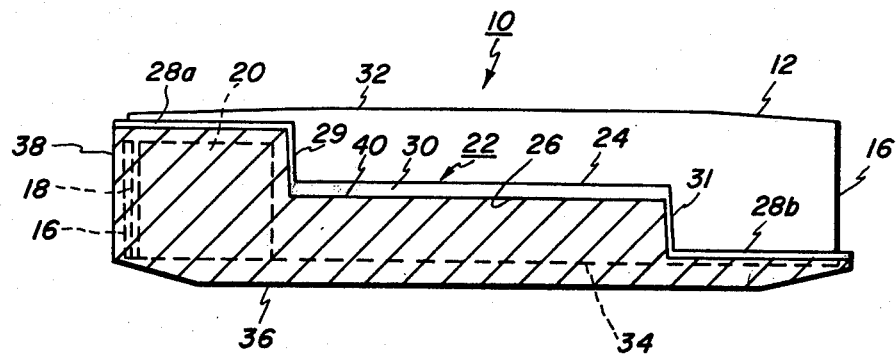
FIG. 1 is a side elevation view of a disk cartridge of the invention with the removable cover thereof shown in a working position.
Figure 2:
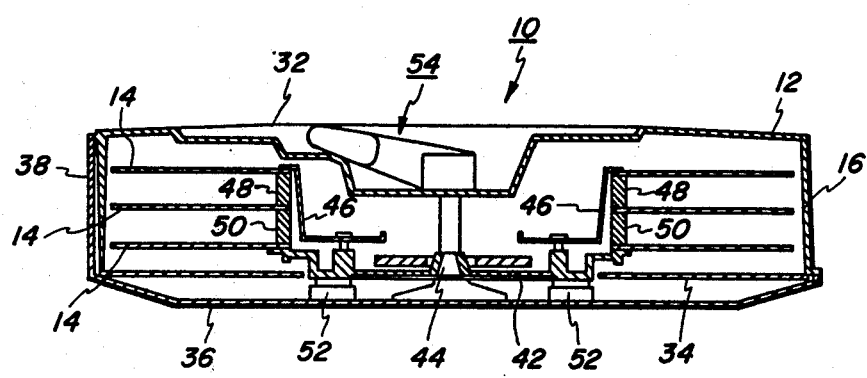
FIG. 2 is a cross-sectional view of the disk cartridge of FIG. 1 with various components deleted for clarity of others.
Figure 4:
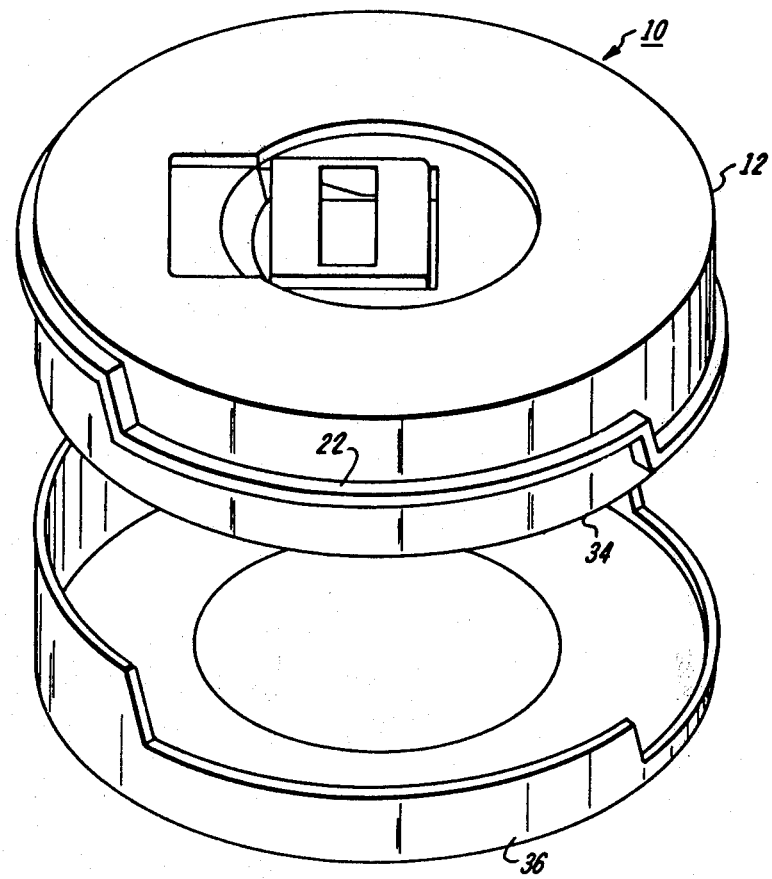
FIG. 4 is a perspective view of the disk cartridge of FIGS. 1 and 2.

Referring to FIGS. 1, 2 and 4, a recording disk cartridge 10 is shown comprising a main housing 12 in which a desired number of recording disks 14 may be mounted for rotation about their axes. There are preferably three recording disks 14 coaxially mounted in the housing 12 by means to be described below. The disks 14 are each desirably magnetic recording disks and may be of any conventional type.

The housing 12 has a circularly cylindrical peripheral side wall 16. A pair of arcuate openings 18 and 20 are formed at predetermined locations in the side wall 16. The opening 18 is provided to enable an electromagnetic head assembly (not shown) to be accessed into the cartridge so that data may be recorded onto and read from the various surfaces of the disks 14. An exemplary electromagnetic head assembly is depicted in the above-mentioned U.S. Application Ser. No. 633,206. The opening 20 is provided to enable a suitable conventional brush assembly (not shown) to be accessed into the cartridge for maintaining the various surfaces of the disks 14 free from contaminating dust particles and the like.

As shown in FIG. 1, the peripheral side wall 16 of the housing 12 has a ridge 22 formed thereon. The ridge extends outwardly of the peripheral side wall 16 at a predetermined radius and has an upper surface 24 and a lower surface 26. The ridge 22 is defined by a plurality of arcuate sections, i.e. a first pair of opposing sections 28a and 28b and a second pair of opposing sections 30 (only one shown). The sections 30 are preferably identical in dimension and size and are disposed in diametric opposition to one another. Desirably, the arc subscribed by each section 30 is approximately about 90°. The sections 30 are also desirably coplanar in the sense that the lower surface 26 of each section is coplanar and the upper surface 24 of each section is coplanar.

The sections 28a and 28b are also preferably identical in dimension and size and are disposed in diametric opposition to one another. Desirably, the arc subscribed by each of sections 28a and 28b is approximately about 90°. Unlike sections 30, however, the sections 28a and 28b are disposed at different vertical levels on the peripheral side wall 16. Specifically, the ridge section 28a is preferably located closely adjacent an upper surface 32 of the housing 12 and the ridge section 28b is preferably located closely adjacent a lower surface 34 of the housing 12.

The section 28a is connected to the opposing sections 30 at one end thereof by a pair of connector segments 29 (only one shown) of the ridge 22. Similarly, the section 28b is connected to the opposing sections 30 at the other end thereof by a pair of connector segments 31 (only one shown) of the ridge 22.

In view of the various preferred dimensions and spacings of the ridge sections 28a, 28b and 30, it will be noted that the contour of the peripheral side wall 16 at the lower surface 26 of the ridge 22 is the substantial complement of the contour of the peripheral side wall 16 at the upper surface 24 of the ridge 22. The benefits of such relationship will become more readily apparent below.

Referring to FIGS. 1-4, the disk cartridge 10 also comprises a dust cover 36 which is normally removably mounted to the housing 16 by means which will be described below. The cover 36 has a circularly cylindrical peripheral side wall 38 which has an upper surface 40 contoured substantially the same as that of the peripheral side wall 16 of the housing 12 at the lower and upper surface 26 and 24, respectively, of the ridge 22. In this manner, and as shown in FIG. 1, the cover may be disposed over the lower end of the housing 12 with the upper surface 40 of the peripheral wall 38 seated against the lower surface 26 of the ridge 22. This corresponds to the working position of the cover 36 where it acts to prevent dust particles and the like from entering the carriage housing 12 through the openings 18 and 20.

Figure 3:
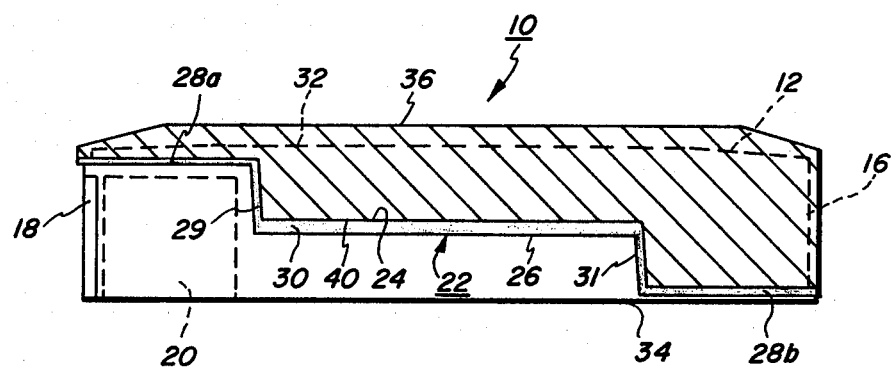
FIG. 3 is a side elevation view of the disk cartridge of FIGS. 1 and 2 with the removable cover thereof shown in a storage position.

Also by reason of the contoured shape of the upper surface 40 of the peripheral side wall 38 of the cover 36 as above-described, the cover may be disposed upside-down over the upper end of the housing 12 with the upper surface 40 of the peripheral side wall 38 being seated against the upper surface 24 of the ridge 22, as shown in FIG. 3. This corresponds to the storage position of the cover 36 during use of the cartridge 10 in a disk drive device of the type disclosed in the above-mentioned application Ser. No. 633,206.

It will be immediately apparent with reference to FIG. 3 that the overall height of the cartridge 10 with the cover 36 in its storage position is not significantly increased over the height of the housing per se, and preferably is substantially the same as the overall height of conventional single disk cartridges with its dust cover in a storage position.

Referring now more particularly to FIG. 2, the disks 14 are coaxially mounted to a rotatable disk hub 42 which has an opening 44 for engaging the spindle of a disk drive (not shown) in a conventional manner. The disks 14 are so mounted by means of an arcuate clamp 46 which is bolted at its lower end to the hub 42 and is pressed against the inner rim of the upper-most disk 14 at its upper end. An appropriate pair of circular spacer elements 48 and 50 are used to separate the three disks 14 by a predetermined amount so that separate electromagnetic head assemblies (not shown) can have access to respective surfaces of the disks in a known manner.

Attached to the inner surface of the cover 36 are a plurality of permanent magnets 52 (only two shown). When the cover is in its working position (FIGS. 1 and 2), the magnets are magnetically held to the lower surface of the hub 42, thereby forcibly retaining the cover in its working position. When it is desired to remove the cover 36, a conventional cover disconnecting mechanism 54 is operated to move the entire hub-disk assembly upwardly, thereby breaking contact with the magnets 52 and allowing the cover to be removed. Portions of the cover disconnecting mechanism 54 have been deleted from the drawing for clarity of the remaining components and such mechanism will not be described in detail since it forms no part of the present invention and is entirely conventional in nature. If desired, details of a preferred cover disconnecting mechanism and the specific manner by which it may be operated to disconnect the cover 36 from the housing 12 are disclosed in the above-referenced U.S. Pat. No. 3,635,608.

Although the present invention has been described with respect to a presently preferred embodiment, it will be appreciated by those skilled in the art that various modifications, substitutions, etc. may be made without departing from the spirit and scope of the invention as defined in and by the following claims.

What is claimed is:

1. A recording disk cartridge comprising:
a housing in which at least one recording disk may be mounted for rotation about its axis, said housing having a peripheral side wall about which a ridge is formed, said ridge being defined by a plurality of sections at least some of which are spaced from one another in a direction parallel to the axis of rotation of a disk mounted in said housing, the dimensions and spacings of said sections being such that the contour of said peripheral side wall at the lower surface of said ridge is the substantial complement of the contour of said peripheral side wall at the upper surface of said ridge; and
a cover including a peripheral side wall having an upper surface that is contoured substantially the same as that of the peripheral side wall of said housing at the lower and upper surfaces of said ridge and having a maximum height only slightly greater than the maximum height of the peripheral side wall of the housing above and below said ridge, whereby said cover may be disposed over the lower end of said housing with the upper surface of the peripheral side wall of said cover seated against the lower surface of said ridge with only a slight increase in the height of the combined housing and cover relative to the housing alone, and whereby said cover may be disposed upsidedown over the upper end of said housing with the upper surface of the peripheral side wall of said cover seated against the upper surface of said ridge with only a slight increase in the height of the combined housing and cover relative to the housing above.

2. The recording disk cartridge of claim 1, wherein the peripheral side walls of said housing and said cover are both circularly cylindrical in configuration.

3. The recording disk cartridge of claim 2, wherein said ridge is defined by first and second pairs of arcuate sections, said first pair of arcuate sections being substantially coplanar and said second pair of arcuate sections being displaced from one another in a direction parallel to said axis of rotation.

4. The recording disk cartridge of claim 3, wherein said first pair of arcuate sections are diametrically opposed to one another and each subscribe an arc of approximately about 90°.

5. The recording disk cartridge of claim 4, wherein said second pair of arcuate sections are diametrically opposed to one another and each subscribe an arc of approximately about 90°.

6. The recording disk cartridge of claim 5, wherein peripheral side wall of said housing has a first arcuate opening defined therein adapted to provide a recording assembly access to the surfaces of a recording disk mounted in said housing.

7. The recording disk cartridge of claim 6, wherein the peripheral side wall of said housing has a second arcuate opening defined therein adapted to provide a cleaning device access to the surfaces of a recording disk mounted in said housing.

8. The recording disk cartridge of claim 1, in combination with a plurality of recording disks coaxially mounted in said housing for rotation about their axes.

9. The recording disk cartridge of claim 8, wherein there are three recording disks mounted in said housing.

10. The recording disk cartridge of claim 9, wherein said recording disks are magnetic recording disks.

11. The recording disk cartridge of claim 7, in combination with three magnetic recording disks coaxially mounted in said housing for rotation about their axes.

* * * * *